US011834583B2

(12) United States Patent
Ramakrishnan

(10) Patent No.: US 11,834,583 B2
(45) Date of Patent: Dec. 5, 2023

(54) HIGH TEMPERATURE PROTECTIVE COATING

(71) Applicant: A.W. CHESTERTON COMPANY, Groveland, MA (US)

(72) Inventor: Muni Ramakrishnan, Northborough, MA (US)

(73) Assignee: A.W. CHESTERTON COMPANY, Groveland, MA (US)

( * ) Notice: Subject to any disclaimer, the term of this patent is extended or adjusted under 35 U.S.C. 154(b) by 512 days.

(21) Appl. No.: 15/931,140

(22) Filed: May 13, 2020

(65) Prior Publication Data

US 2020/0362195 A1 Nov. 19, 2020

Related U.S. Application Data

(60) Provisional application No. 62/848,423, filed on May 15, 2019.

(51) Int. Cl.

| | | |
|---|---|---|
| *C09D 163/04* | (2006.01) | |
| *C09D 163/00* | (2006.01) | |
| *C08F 220/10* | (2006.01) | |
| *C08F 230/08* | (2006.01) | |
| *C08G 59/24* | (2006.01) | |
| *C08G 59/30* | (2006.01) | |
| *C08G 59/40* | (2006.01) | |
| *C08K 3/22* | (2006.01) | |
| *C08K 3/26* | (2006.01) | |
| *C08K 3/36* | (2006.01) | |
| *C08K 5/17* | (2006.01) | |
| *C09D 5/18* | (2006.01) | |
| *B32B 15/092* | (2006.01) | |
| *B32B 27/18* | (2006.01) | |
| *B32B 27/26* | (2006.01) | |
| *B32B 27/38* | (2006.01) | |

(52) U.S. Cl.

CPC .......... *C09D 163/04* (2013.01); *C08F 220/10* (2013.01); *C08F 230/08* (2013.01); *C08G 59/245* (2013.01); *C08G 59/306* (2013.01); *C08G 59/4014* (2013.01); *C08K 3/22* (2013.01); *C08K 3/26* (2013.01); *C08K 3/36* (2013.01); *C08K 5/17* (2013.01); *C09D 5/18* (2013.01); *C08K 2003/2227* (2013.01); *C08K 2003/2241* (2013.01); *C08K 2003/265* (2013.01)

(58) Field of Classification Search
CPC .. C09D 163/00; C09D 163/04; B32B 15/092; B32B 27/18; B32B 27/26; B32B 27/38
USPC .................................................. 523/428, 433
See application file for complete search history.

(56) References Cited

U.S. PATENT DOCUMENTS

| | | | |
|---|---|---|---|
| 2003/0153682 A1 | 8/2003 | Sakugawa | |
| 2009/0029173 A1* | 1/2009 | Schramm | ............... C09D 5/106 |
| | | | 106/14.37 |
| 2010/0032826 A1 | 2/2010 | Tachibana et al. | |
| 2011/0218267 A1 | 9/2011 | Shinano et al. | |

FOREIGN PATENT DOCUMENTS

| | | | | |
|---|---|---|---|---|
| EP | 0123262 A2 | 10/1984 | | |
| EP | 1 810 985 A1 | 7/2007 | | |
| JP | 2005015572 A | * | 1/2005 | ............. C08G 59/50 |
| WO | 98/32792 A1 | 7/1998 | | |
| WO | 2017/068015 A1 | 4/2017 | | |

OTHER PUBLICATIONS

Machine translation of JP-2005015572-A (No. date).*
Partial translation of Tables 1-2 in JP-2005015572-A (no date).*
International Search Report and Written Opinion, PCT/US2020/032670, dated Jul. 24, 2020, 15 pages.

* cited by examiner

*Primary Examiner* — Michael J Feely
(74) *Attorney, Agent, or Firm* — Nelson Mullins Riley & Scarborough LLP; Anthony A. Laurentano

(57) ABSTRACT

A protective coating, comprising a binder component mixture having a reactive mixture portion and a filler mixture portion, wherein the reactive mixture portion includes an epoxy resin part and an epoxy silane part, wherein the epoxy silane part is present in an amount of about 10 wt % of the reactive mixture portion and about 40 wt % of the reactive mixture portion; and a curing component having one or more amine curing compounds, wherein the amine curing compound of the curing component comprises an unmodified diamino cyclohexane (DACH) that is present in an amount between about 70 wt % and about 100 wt % of the curing component.

13 Claims, No Drawings

HIGH TEMPERATURE PROTECTIVE COATING

RELATED APPLICATION

The present application claims priority to U.S. provisional patent application Ser. No. 62/848,423, filed on May 15, 2019, entitled HIGH TEMPERATURE PROTECTIVE COATING, the contents of which are herein incorporated by reference.

BACKGROUND OF THE INVENTION

The present invention is related to coatings for commercial and industrial products, and specifically relates to protective coatings suitable for high temperature applications.

Conventional protective coating technology uses various organic resins such as epoxy, urethane and polyesters to help protect an underlying substrate. The conventional protective coatings typically include a binder as an active component and a curative component. One conventional type of protective coating includes epoxy resin based coatings, which are well known for their adhesion to metal and other substrates, durability, strength, corrosion protection and chemical resistance. Further, conventional epoxy coatings based on Bisphenol A based resins are limited to a service temperature of 80° C. or less. The coatings can be modified to employ Bisphenol F based resins, which can increase the service temperature capability of the coating to about 100° C.

However, conventional protective coatings are oftentimes unsuitable for high temperature applications, since the coating breaks down when subjected to temperatures in excess of the foregoing temperatures.

SUMMARY OF THE INVENTION

The present invention is directed to a protective coating that includes a resin component mixture and a separate curing component. The resin component mixture can include a reactive mixture portion and a filler mixture portion. The reactive mixture portion includes an epoxy resin component and an epoxy silane, where the epoxy silane part is present in an amount of about 10 wt % of the reactive mixture portion and about 40 wt % of the reactive mixture portion. The curing component can include one or more amine curing compounds, such as an unmodified diamino cyclohexane (DACH). The DACH can be present in an amount between about 70 wt % and about 100 wt % of the curing component. The use of phenolic novalak resins with an appropriate unmodified cycloaliphatic curing agent can increase the cross link capability of the coating and the glass transition temperature, thus resulting in service temperatures in excess of 130° C., and around 200° C. Further, the protective coating of the present invention can help protect against erosion/corrosion, abrasion, impact, and chemical attacks. The protective coating is thus durable, strong, exhibits excellent abilities to adhere to metal and other types of substrates, and is corrosion and chemical resistant. The large amount of epoxy silane in the present invention enables a formation of an epoxy-silicone hybrid matrix which has higher thermal service capability than conventional protective coatings that only employ epoxy resins.

The present invention is directed to a protective coating comprising a binder component mixture having a reactive mixture portion and a filler mixture portion, where the reactive mixture portion includes an epoxy resin part and an epoxy silane part, and the epoxy silane part is present in an amount of about 10 wt % of the active mixture portion and about 40 wt % of the reactive mixture portion. The coating also includes a curing component having one or more amine curing compounds.

The epoxy resin part of the reactive mixture portion is present in an amount between about 60 wt % of the reactive mixture portion and about 90 wt % of the reactive mixture portion. The reactive mixture portion consists essentially of the epoxy resin part and the epoxy silane part, where the epoxy resin part of the reactive mixture portion is present in an amount between about 60 wt % of the reactive mixture portion and about 90 wt % of the reactive mixture portion, and wherein the epoxy silane part of the reactive mixture portion is present in an amount between about 10 wt % of the reactive mixture portion and about 40 wt % of the reactive mixture portion. The epoxy resin part of the reactive mixture portion can include a multi-functional phenolic novalak epoxy resin. Further, the reactive mixture portion of the resin component mixture is present in an amount between about 30 wt % and about 45 wt % of the resin component mixture.

The filler mixture portion can include any combination of a thickening agent component, a pigment component, an anti-cratering component, a repellent component, a desiccating component, an additive component, and a filler component. The thickening agent component includes silica, the pigment component includes titanium oxide, the anti-cratering component includes a polyacrylate material, the repellent component includes a silicone-modified polyacrylate, the desiccating component includes aluminum oxide, the additive component includes feldspar, and the filler component includes calcium carbonate.

According to the teachings of the present invention, the amine curing compound of the curing component comprises one or more amine compounds, and preferably a plurality of amine compounds. The amine curing compound of the curing component can include a diamino cyclohexane (DACH), and specifically an unmodified DACH. The DACH is present in an amount between about 70 wt % and about 100 wt % of the curing component. When a plurality of amine compounds are employed, the another amine curing can include DETA, TETA, Ancamine® 2903, or Ancamine® 2904.

Further, the weight ratio of the resin component mixture to the curing component can be between about 14:1 and about 20:1, and is preferably about 16.8 to 1.

According to another aspect of the present invention, the protective coating comprises a binder component mixture having a reactive mixture portion and a filler mixture portion, where the reactive mixture portion includes an epoxy resin part and an epoxy silane part, and the epoxy silane part is present in an amount of about 10 wt % of the reactive mixture portion and about 40 wt % of the reactive mixture portion. The protective coating also includes a curing component having one or more amine curing compounds, where the amine curing compound of the curing component comprises an unmodified diamino cyclohexane (DACH) that is present in an amount between about 70 wt % and about 100 wt % of the curing component.

The weight ratio of the resin component mixture to the curing component is between about 14:1 and about 20:1, and is preferably about 16.8:1. Further, the stoichiometric ratio can be between about 0.9 to about 1.1, and is preferably about 1.0.

DETAILED DESCRIPTION

The present invention is directed to protective coatings, and is specifically directed to high temperature protective coatings that help protect a surface of a substrate. The protective coating can help protect against erosion/corrosion, abrasion, impact, and chemical attacks. The protective coating of the present invention is durable, strong, exhibits excellent abilities to adhere to metal and other types of substrates, and is corrosion and chemical resistant.

The high temperature protective coating of the present invention includes a protective coating formulation that consists of two primary parts or components, namely a Part A resin binder component mixture and a separate Part B curing component. The Part A and B components are not pre-mixed together but rather are formed as separate components or mixtures that are mixed together just prior to use. The protective coating can include other material, components or solutions, as is known in the art. The Part A resin component mixture can include or consist of a reactive mixture portion and a filler mixture portion. As such, the weight percentages of the various components set forth herein are listed relative to the weight percentages forming or comprising each specific mixture portion, also referred to as a percentage of the resin matrix, unless otherwise noted.

The Part A resin component mixture of the protective coating formulation of the present invention can include or consist of a reactive pre-polymer or polymer, such as an epoxy resin, and a silane coupling agent, such as an epoxy silane, as the main or primary resin binder parts or components of the mixture. The epoxy resin can preferably be a multi-functional phenolic novalak epoxy resin, with a functionality in the range between about 2.5 to about 4.0. The novolak epoxy resin has a viscosity that is higher than the viscosity of the epoxy silane. Specifically, the higher the functionality of the novalak epoxy resin, the higher the overall viscosity. According to one practice of the present invention, the active mixture portion of the Part A resin component mixture only includes two types of active components, such as the reactive polymer or pre-polymer and the silane coupling agent.

In conventional protective coatings, epoxy silane, if at all used, is typically present in quantities less than 1% by weight of the reactive organic ingredients. In the present invention, the epoxy silane is present in significantly higher amounts, such as between about 10% and about 40% by weight of the reactive organic ingredients. The recited range is intended to cover any and all selected amounts within the recited range. As such, an attribute of the current protective coating formulation is the relatively large or high amount of epoxy silane used as a binder. The relatively low viscosity of the epoxy silane helps compensate for the relatively high viscosity of the novalak epoxy resin.

An advantage of employing a large amount of epoxy silane according to the teachings of the present invention is that it enables the formation of an epoxy-silicone hybrid matrix which has superior thermal resistance and higher thermal service capability than conventional protective coatings that only employ epoxy resins. Further, the relatively low viscosity of epoxy silane lowers the overall viscosity of the protective coating, which advantageously enables the addition of a relatively large amount of solid fillers to the protective coating for high permeation resistance.

The filler mixture component or portion of the Part A resin component mixture serves to provide a stable mixture that is suitable for the coatings intended purpose. The filler mixture portion provides selected functions and properties such as the right viscosity for ease of application such as by brushing, troweling or by spraying so as to create a desired thickness build which exhibits vertical sag resistance, while concomitantly reducing the cost of the overall mixture by reducing the percentage by weight of more expensive components. The proper selection and incorporation of fillers results in improved compressive strength, higher erosion and abrasion resistance, higher permeation resistance, higher chemical resistance (lower intake of chemicals in immersion services) and higher modulus of rigidity. The filler mixture portion can include or consist of a combination of any of the following: a thickening or reinforcing component or filler, such as silica and preferably fumed silica; a pigment component, such as any type of titanium oxide (e.g., TiO or $TiO_2$); and mineral fillers such as ground feldspar and preferably Minspar, Minex (Nepheline Syenite), barium sulphate and calcium carbonate. The filler can also include ceramic materials such aluminum oxide, and preferably aluminum oxide 400, and silicon carbide, preferably SiC 400. The formulation can also include one or more liquid additives, which are typically non-reactive, but provide vital morphological and surface characteristics. Examples of suitable additives include an anti-cratering component, such as a polyacrylate material, and preferably BYK 354; a repellent (e.g., cleaning effect) component, such as a silicone-modified polyacrylate, and preferably BYK-Silclean 3700; a desiccating component, such as silica gel or aluminum oxide, and preferably aluminum oxide BR 400; an additive such as ground feldspar, and preferably Minspar 3; and a filler, such as calcium carbonate. The active mixture portion of the Part A resin component mixture is preferably in the range of between about 30 wt % and about 45 wt %. The foregoing fillers and additives are non-reactive components. Typically, fillers are solid components and are used in relatively large amounts (e.g., between about 1% wt and about 50% wt), whereas additives are liquid components and are typically under 2% by weight.

The Part B curing component of the protective coating formulation of the present invention can include one or more amine curing compounds or agents, and preferably can include a plurality of different amine curing agents (e.g., a blend of curing agents). According to one embodiment, the amine curing component can consist solely of diamino cyclohexane (DACH), or can include DACH in combination with one or more other amine curing agents. The DACH of the present invention is preferably an unmodified diamino cyclohexane (DACH). Typically, DACH is used in a physical blend with other amines or in an adduct, which is a chemically modified form, so as to control the speed of cure and to achieve a desired cured state. The PART B curing component thus consists of a relatively high percentage of unmodified diamino cyclohexane (DACH), in amounts greater than or equal to about 70 wt % of the curing component (e.g., resin matrix), and can include amounts as high as 100% of the curing component (e.g., resin matrix), if a single amine material is to be used. Alternatively, if DACH is combined with one or more other amines, then the DACH amount can range between about 70 wt % and about 99 wt % of the curing component. The recited ranges are intended to cover any and all selected amounts within the recited ranges. The DACH can optionally be combined or mixed with one or more other amines, such as a commercially available amine blend (less than or equal to about 30%) to optimize the curing speed of the coating. According to one embodiment, the unmodified DACH can be combined with a modified aliphatic, cycloaliphatic, or aromatic amine or polyamine curing agent, such as for example Ancamine®

2903 or 2904, diethylenetriamine (DETA), triethylenetetramine (TETA), and the like. Depending on the types and combination of fillers, the weight ratio of the Part A resin component mixture to the Part B curing component can be between about 14:1 and about 20:1, and preferably is about 16.8 to 1. Further, the corresponding stoichiometric ratio can be in the range of about 0.9 to about 1.1.

The DACH curative with associated high cross link capability results in a tightly cross-linked structure when combined with the resin component mixture (e.g., epoxy-silane blend) of the present invention. The DACH curative in the amounts used in the protective coating of the present invention has a relatively low viscosity of between about 5 cps and about 10 cps that lowers the overall viscosity of the protective coating mix, which thus enables the addition of a relatively large amount of solid fillers for high permeation resistance. The overall result is a binder system capable of service temperatures up to about 200° C., as well as high permeation resistance, which can still be sprayed with minimal use of solvents. That is, the resulting mix of the Part A resin component mixture and the Part B curing component of the protective coating formulation with a stoichiometric ratio of about 1.0 results in a highly cross linkable system capable of producing a coating with a glass transition temperature Tg (e.g., a measure of the thermal resistance of the coating) of about 220° C. The mix viscosity of the protective coating, even with large amounts of highly viscous novalak resin, has a low enough viscosity that the coating can be mixed or loaded with other functional fillers to maximize its permeation resistance. This feature is important in various applications that deal with high temperature aqueous environments.

The protective coating of the present invention thus employs an epoxy silane mixture as a significant percentage of the overall binder composition. This relatively high percentage of epoxy silane results in the formation of an epoxy-silicone hybrid matrix, which has superior thermal resistance and higher service temperature capability than an epoxy matrix alone. Further, due to the low viscosity of the epoxy silane mixture, there is a reduction in the overall resin mix viscosity, which enables higher leading of functional fillers for superior permeation resistance.

Another aspect of the protective coating of the present invention is the use of DACH as a major component of the Part B curing component. The DACH is typically sold in a modified or diluted form by commercial vendors, in order to make the curative user-friendly, in terms of cure rate, flow behavior, appearance, working time, and the like. Typically, benzyl alcohol is also used in commercially available products for the same reasons. The present inventors have realized that using unmodified DACH directly rather than in the modified form can create a protective coating having a high cross link capability and very low viscosity.

The present invention is also directed to a method of coating or treating a surface of a substrate with the protective coating of the present invention. As used herein, the term "coating: is intended to include any type of covering in any form (e.g., liquid semi-liquid, or solid) that can be applied to a surface of an object. The coating can be applied to a portion of the surface or to all of the surface, and can be applied in a single layer or in multiple layers. As used herein, the term "substrate" is intended to include any object, of any type, and made of any suitable material, that has one or surfaces. Examples of the types of material that the protective coating of the present invention can be applied to include metal and concrete. The coating can be applied to the surface of the substrate according to known techniques, such as by brushing, troweling, spraying, rolling, pouring, painting and the like. The coating can be applied in a single layer or in multiple layers to the surface.

Epoxy resin based coatings are typically used as protective coatings in industrial environments at service conditions typically below 80° C. The glass transition temperature (Tg), which is a measure of the thermal resistance of the coating, is typically in the 80-90° C. range. By choosing a novalak based epoxy resin, instead of a Bisphenol A based epoxy resin, with appropriate curing agent, the Tg increases to between about 120° C. and about 130° C., following a high temperature cure. The glass transition temperature can be further increased by combining the resin component mixture (e.g., binding component) with the DACH curing component to about 200° C.

The protective coating of the present invention has a glass transition temperature of 220° C. after a high temperature cure of about 180° C. The high temperature cure can be achieved in situ (e.g., in service) after an initial cure is performed that is sufficient to place the product in service. A typical cure before placing the coating in service is about two days at about 23° C. This relatively high transition temperature allows for service temperatures of about 190° C. or higher. This makes the protective coating of the present invention suitable for use in high temperature environments, such as in the oil and gas industries. The epoxy-silicone hybrid resin mix of the active mixture component of the protective coating formulation increases the thermal capability beyond conventional epoxy resin based coatings. Further, the use of the diamino cyclohexane (DACH) curing agent in unmodified form further enhances the crosslink and thermal capability of the coating. The coating also employs fillers having a volume of about 31% to enhance permeation resistance.

The following is simply an example of the specific components and associated amounts of the high temperature protective coating of the present invention and should not be construed in a limiting sense.

Example 1

The formulation of the protective coating of the present invention can include the following general components. The Part A resin component mixture can include a reactive mixture component, which is preferably in liquid form, and which includes epoxy silane and an epoxy resin, such as an epoxy phenol novalac 3 (EPN3). The novalak epoxy resin can have a functionality in the range of about 2.4 to about 4.0. The filler mixture portion of the resin component can have additives such as a polyacrylate-based additive, such as for example BYK 354, a silicon-containing additive, such as for example BYK Silclean 3700, so as to improve the easy-to-clean effect of the protective coating. The protective coating can also include additional functional fillers comprising the filler mixture portion of the protective coating. The filler mixture portion can include for example silica, such as fumed silica, titanium oxide (TiO or $TiO_2$), aluminum oxide BR 400 or other similar ingredient, minspar 3 or other similar ingredient, and calcium carbonate or other similar ingredient. A preferred recipe for the protective coating is as follows.

| Part A Resin | | |
|---|---|---|
| | weight % in liquid mix | weight % range |
| Reactive Mixture Portion (RMP) | | |
| (liquid mix) | (preferred) | |
| Epoxy phenol novalac 3 | about 76.90% | about 60-90% |
| Silane epoxy | about 23.10% | about 10-40% |

All of the Part A resin component mixture (resin liquid mix) listed above and the Part B curing component (e.g., other functional fillers)

| | weight % | weight % range |
|---|---|---|
| RMP mix (see above) | about 38.52% | about 30-45% |
| Fumed silica | about 1.07% | about 0.5-2.0% |
| Titanium oxide | about 1.99% | about 1-5% |
| BYK 354 | about 0.30% | about 0-1.5% |
| BYK Silclean 3700 | about 0.26% | about 0-1% |
| Aluminum Oxide BR 400* | about 16.07% | about 5-40% |
| Minspar 3* | about 24.49% | about 5-40% |
| calcium carbonate* | about 17.30% | about 5-40% |

*other similar ingredients can also be used.

| Part B Curing | | |
|---|---|---|
| | weight % | weight % range |
| Curing agent blend | (Preferred) | |
| Diamino cyclohexane (unmodified DACH) | about 90% | about 70-100% |
| Ancamine ® 2903 | about 10% | about 0-30% |

The skilled artisan will readily recognize that use other fast curing agents such as DETA, TETA, and Ancamine® 2904 can be used in place of Ancamine® 2903.

Further, the weight ratio of Part A to Part B can be about 16.8 to 1. Further, the corresponding stoichiometric ratio is about 1.0, the weight ratio can vary between about 14:1 to about 20:1, and the stoichiometric ratio can vary between about 0.9 to about 1.1.

I claim:

1. A protective coating, comprising
a binder component mixture having a reactive mixture portion and a filler mixture portion, wherein the reactive mixture portion consists essentially of an epoxy resin part and an epoxy silane part, wherein the epoxy silane part is present in an amount of between about 10 wt % of the reactive mixture portion and about 40 wt % of the reactive mixture portion, and
a curing component having one or more amine curing compounds, wherein the one or more amine curing compounds includes an unmodified diamino cyclohexane (DACH) present in an amount between about 70 wt % and about 100 wt % of the curing component,
wherein the weight ratio of the binder component mixture to the curing component is about 16.8:1.

2. The protective coating of claim 1, wherein the epoxy resin part of the reactive mixture portion is present in an amount between about 60 wt % of the reactive mixture portion and about 90 wt % of the reactive mixture portion.

3. The protective coating of claim 1, wherein the epoxy resin part of the reactive mixture portion comprises a multi-functional phenolic novolak epoxy resin.

4. The protective coating of claim 1, wherein the reactive mixture portion of the binder component mixture is present in an amount between about 30 wt % and about 45 wt % of the binder component mixture.

5. The protective coating of claim 1, wherein the filler mixture portion comprises any combination of a thickening agent component, a pigment component, an anti-cratering component, a repellent component, a desiccating component, an additive component, and a filler component.

6. The protective coating of claim 5, wherein the thickening agent component includes silica, the pigment component includes titanium oxide, the anti-cratering component includes a polyacrylate material, the repellent component includes a silicone-modified polyacrylate, the desiccating component includes aluminum oxide, the additive component includes feldspar, and the filler component includes calcium carbonate.

7. The protective coating of claim 1, wherein the one or more amine curing compounds of the curing component comprises a plurality of amine compounds, and the unmodified diamino cyclohexane (DACH) is present in an amount between about 70 wt % and about 99 wt % of the curing component.

8. A protective coating, comprising
a binder component mixture having a reactive mixture portion and a filler mixture portion, wherein the reactive mixture portion includes an epoxy resin part and an epoxy silane part, wherein the epoxy silane part is present in an amount of between about 10 wt % of the reactive mixture portion and about 40 wt % of the reactive mixture portion, and
a curing component having one or more amine curing compounds, wherein the one or more amine curing compounds of the curing component comprises an unmodified diamino cyclohexane (DACH) that is present in an amount between about 70 wt % and about 100 wt % of the curing component,
wherein the weight ratio of the binder component mixture to the curing component is between about 14:1 and about 20:1.

9. The protective coating of claim 8, wherein the reactive mixture portion of the binder component mixture is present in an amount between about 30 wt % and about 45 wt % of the binder component mixture.

10. The protective coating of claim 9, wherein a stoichiometric ratio of the binder component mixture to the curing component is between about 0.9 to about 1.1.

11. The protective coating of claim 8, wherein the filler mixture portion comprises any combination of a thickening agent component, a pigment component, an anti-cratering component, a repellent component, a desiccating component, an additive component, and a filler component.

12. A protective coating, comprising
a binder component mixture having a reactive mixture portion and a filler mixture portion, wherein the reactive mixture portion consists essentially of an epoxy resin part and an epoxy silane part, wherein the epoxy silane part is present in an amount of between about 10 wt % of the reactive mixture portion and about 40 wt % of the reactive mixture portion, and
a curing component having one or more amine curing compounds, wherein the one or more amine curing compounds includes an unmodified diamino cyclohexane (DACH) present in an amount between about 70 wt % and about 99 wt % of the curing component,
wherein the one or more amine curing compounds of the curing component comprises another amine curing compound, and wherein the another amine curing compound includes DETA, TETA, or a cycloaliphatic amine.

13. A protective coating, comprising
a binder component mixture having a reactive mixture portion and a filler mixture portion, wherein the reactive mixture portion includes an epoxy resin part and an epoxy silane part, wherein the epoxy silane part is present in an amount of between about 10 wt % of the reactive mixture portion and about 40 wt % of the reactive mixture portion, and
a curing component having one or more amine curing compounds, wherein the one or more amine curing compounds of the curing component comprises an unmodified diamino cyclohexane (DACH) that is present in an amount between about 70 wt % and about 100 wt % of the curing component,
wherein the weight ratio of the binder component mixture to the curing component is between about 14:1 and about 20:1,
wherein a stoichiometric ratio of the binder component mixture to the curing component is between about 0.9 to about 1.1.

* * * * *